United States Patent [19]

Tominaga et al.

[11] 4,444,818
[45] Apr. 24, 1984

[54] REINFORCING ADHESIVE SHEETS

[75] Inventors: Takashi Tominaga; Toshihiko Ariyoshi; Eishi Asoshina, all of Osaka, Japan

[73] Assignee: Nitto Electric Industrial Co., Ltd., Osaka, Japan

[21] Appl. No.: 462,178

[22] Filed: Jan. 31, 1983

[30] Foreign Application Priority Data

Jan. 30, 1982 [JP] Japan .................................. 57-13693

[51] Int. Cl.³ .............................................. B32B 5/20
[52] U.S. Cl. ...................................... 428/36; 293/126; 293/128; 296/188; 296/191; 428/215; 428/220; 428/251; 428/261; 428/347; 428/349; 428/913
[58] Field of Search ................. 174/DIG. 8; 293/126, 293/128; 296/191, 188; 428/251, 252, 36, 215, 415, 913, 347, 220, 349, 261

[56] References Cited

U.S. PATENT DOCUMENTS 4,378,395  3/1983  Asoshina et al. ................... 428/158
4,399,174  8/1983  Tanaka et al. ....................... 296/188

Primary Examiner—George F. Lesmes
Assistant Examiner—P. R. Schwartz
Attorney, Agent, or Firm—Sughrue, Mion, Zinn, Macpeak, and Seas

[57] ABSTRACT

A thermosetting adhesive sheet is described, comprising a thermosetting resin sheet-shaped prepreg with a reinforcing material embedded therein, and a flattened tubular material provided on one side of the prepeg, said flattened tubular material being capable of nearly recovering the original tubular form on heating and being narrower in width than the prepreg. The prepreg may be of the two-layer structure comprising a first thermosetting resin composition layer and a second thermosetting resin composition layer.

18 Claims, 6 Drawing Figures

REINFORCING ADHESIVE SHEETS

FIELD OF THE INVENTION

The present invention relates to reinforcing adhesive sheets.

BACKGROUND OF THE INVENTION

Heretofore, steel plates for, e.g., the body of a car, have been reinforced by various techniques. For example, in the case of the outer panels of car bodies, e.g., roofs, fenders, hoods, trunks, quater panels, and doors, which are in a relatively broad and flat form, and are reduced in thickness, a plate comprising a metallic reinforcing material has been bonded to the inside thereof by spot welding or with adhesives, because it is necessary to provide the outer panels with enough stiffness to withstand external forces. The use of such metallic reinforcing materials, however, gives rise to various problems because of their heavy weights. For example, the weight of the outer panels, which are originally reduced in thickness for the purpose of decreasing the weight of the car body, is increased, the production costs are raised, and furthermore, the step of mounting the outer panels is complicated.

It is also known that polymeric materials, such as asphalt rubber, epoxy resins, acrylic resins, phenol resins, and unsaturated polyester resins, are coated on or bonded to the back surface of the outer panel in a fairly large thickness over a fairly large area for both the purposes of preventing the vibration of car body outer panels and for reinforcing them. It is said that the stiffness is proportional to the cube of the thickness. Therefore, the stiffness of the outer panel can be increased by increasing the thickness of the polymeric material layer. The use of such large amounts of polymeric materials, however, leads to increases in the weight and production costs, as is the case with the above-described metallic reinforcing materials.

Japanese Patent Application (OPI) No. 39966/81 (the term "OPI" as used herein refers to a "published unexamined Japanese patent application") discloses a reinforcing material for outer panels of car bodies comprising a thermosetting resin layer (prepreg) and a foamable sheet. Japanese Patent Application (OPI) No. 151361/82 also discloses a reinforcing material comprising a two-layer structure prepreg and a foamable sheet.

However, those prior art reinforcing materials have the following disadvantages:

(1) When the foamable sheet is foamed by heating, the sheet foams three dimensionally and the height of the resulting reinforcing material is not sufficient. Therefore, an excellent reinforcing effect cannot be obtained;

(2) The foamed material after foaming tends to absorb a moisture, resulting in causing corrosion of metallic plates of, e.g., outer panel of car bodies; and (3) The foamed material leaks out of the edges of the prepreg, resulting in poor appearance.

SUMMARY OF THE INVENTION

The object of the invention is to provide reinforcing adhesive sheets which are light weight, inexpensive, and further, which are capable of greatly increasing the stiffness of members to be reinforced.

The present invention relates to reinforcing adhesive sheets comprising a sheet prepreg with a reinforcing material embedded in a thermosetting resin composition, and a flattened tubular material on one side of the sheet prepreg, said flattened tubular material being narrower than the sheet prepreg and being capable of nearly recovering the original tubular form on heating.

DETAILED DESCRIPTION OF THE INVENTION

Figure 1:
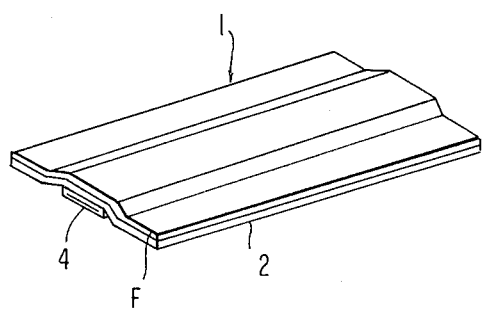
FIG. 1 is a perspective view of a reinforcing adhesive sheet of the invention.

When a reinforcing adhesive sheet of the invention is bonded to the back surface of a member to be reinforced in such a manner that the flattened tubular material is in contact with the back surface, and heated, the flattened tubular material will recover the original tubular form, pushing up the sheet prepreg. In this condition, the reinforcing adhesive sheet cures, forming a rib structure.

The thus-bonded sheet has much higher stiffness than sheet materials of uniform thickness which are bonded and cured.

It may be considered that an uncured or half-cured prepreg is adhered to a tubular material to form a reinforcing sheet in which a rib structure has been previously formed, and the thus-formed reinforcing sheet is bonded and heated. However, the adhesion workability and so forth of the reinforcing sheet are poor, and particularly when it is bonded to an uneven surface, are very poor.

The sheet prepreg of the invention can be prepared, for example, by coating a thermosetting resin composition on both sides of a reinforcing material. Moreover, there can be employed a method in which the thermosetting resin composition is molded in a sheet form, and the thus-formed sheet and a reinforcing material are combined together in one body by techniques such as lamination. In these reinforcing sheets, the prepreg is of the one-layer structure. In a preferred embodiment of the invention, the sheet prepreg of the invention is of the two-layer structure.

In the preferred embodiment of the invention, the reinforcing adhesive sheet comprises a first thermosetting resin composition layer with a reinforcing material embedded therein, said composition being such that when provided on a metallic plate and heat-cured, it produces a tensile modulus sufficient to increase the stiffness of the metallic plate; a second thermosetting resin composition layer laminated on one side of the first thermosetting resin composition layer, said composition being such that when heat-cured in the same manner as in the first thermosetting resin composition layer, it produces a tensile modulus insufficient to increase the stiffness of the metallic plate; and a flattened tubular material on the second thermosetting resin composition layer, said flattened tubular material being narrower than the sheet prepreg comprising the first and second thermosetting resin composition layers, and being capable of nearly recovering the original tubular form. As can be seen, the sheet prepreg of this reinforcing adhesive sheet is of the two-layer structure.

In the reinforcing adhesive sheet of the invention, the sheet prepreg is composed of thermosetting resin compositions. The tensile modulus of the sheet prepreg after being heat-cured varies greatly mainly with the formulation of the resin composition; for example, the types of the resin, the curing agent, and other ingredients, and the amounts thereof.

When a metallic plate is reinforced with a thermosetting resin composition which is prepared so as to produce a tensile modulus sufficient to increase the stiffness of the metallic plate, there can be obtained a satisfactory reinforcing effect. However, depending on the type and thickness of the metallic plate, the problem of deformation of the metallic plate due to the shrinkage of the cured composition inevitably occurs. On the other hand, when a thermosetting resin composition producing a tensile modulus insufficient to increase the stiffness of the metallic plate is prepared and used to reinforce the metallic plate, the deformation of the metallic plate due to the shrinkage is almost completely eliminated. However, it has been found that depending on the type and thickness of the metallic plate, the desired reinforcing object cannot be attained.

These problems can be overcome by using the above-described structure; i.e., the first thermosetting resin composition layer with a reinforcing material embedded therein and producing a high tensile modulus, and the second thermosetting resin composition layer producing a low tensile modulus are laminated on each other to form a sheet prepreg; the flattened tubular material is provided on the second thermosetting resin composition layer of the sheet prepreg, said flattened tubular material being narrower than the sheet prepreg and capable of nearly recovering the original form on heating; and the thus-prepared reinforcing adhesive material is bonded to a metallic plate in such a manner that the flattened tubular material is in contact with the metallic plate, and thereafter, heat-cured.

In this preferred sheet prepreg of the two-layer structure, the first thermosetting resin composition layer after being heat-cured should have a tensile modulus sufficient to increase the stiffness of the metallic plate. This tensile modulus is generally from about 30 to about 500 kg/mm$^2$, preferably 50 to 200 kg/mm$^2$. When the tensile modulus is too high, irrespective of the presence of the second thermosetting resin composition layer, the deformation of the metallic plate may occur depending on the type, thickness, and shape of the metallic plate.

The tensile modulus as used herein is measured according to the method described in ISO Recommendation R-257, using a test piece of Type 1 and at Speed B.

The second thermosetting resin composition layer after being heat-cured should have a tensile modulus insufficient to increase the stiffness of the metallic plate. This tensile modulus is generally from about 0.1 to about 22 kg/mm$^2$, preferably 1 to 10 kg/mm$^2$. When the tensile modulus is too small, the reinforcing effect becomes poor depending on the type, thickness, and shape of the metallic plate.

The provision of the above-specified first and second thermosetting resin composition layers is suitable particularly when the resulting reinforcing material is applied to a metallic plate having a thickness of from 0.3 to 2.0 mm, preferably 0.5 to 1.0 mm. The examples of the metallic plate include a steel plate, a copper plate, an aluminum plate, etc.

In the preparation of the first and second thermosetting resin composition layers, epoxy resins are most preferably used as the thermosetting resin. To these epoxy resins, heat-sensitive curing agents and, if necessary, other various additives are added, and the resulting mixture is then sheet-molded in an uncured or half-cured state by the usual method to form the desired composition layer. The epoxy resins used in the present invention generally have the epoxy equivalent of from 100 to 2,000. Further, where the epoxy resins are liquid, those have a viscosity (at 25° C.) of 10 poises or more, and where the epoxy resins are solid, those have a melting point of 130° C. or less.

Other thermosetting resins can be used in place of the epoxy resins. The first and second thermosetting resin composition layers which, when heat-cured, have the above-specified tensile modulus ranges can be prepared by appropriately choosing the types of thermosetting resins, curing agents, and other additives, or the amount of each component being compounded.

Epoxy resins which are most preferably used in the preparation of each of the first and second thermosetting resin compositions include glycidyl ether type, glycidyl ester type, glycidyl amine type, linear aliphatic epoxide type, alicyclic epoxide type, and other type epoxy resins. These epoxy resins can be used alone or in combination with each other depending on the physical properties required for each composition layer.

Any curing agents capable of exhibiting the curing action on heating can be used as heat-sensitive curing agents. In general, they are sufficient to be sensitive within the temperature range of from 60° to 270° C., preferably 80° to 200° C. Curing agents which can be used include dicyandiamide, 4,4'-diaminodiphenylsulfone, imidazole derivatives, e.g., 2-n-heptadecylimidazole, isophthalic acid dihydrazide, N,N-dialkylurea derivatives, and N,N-dialkylthiourea derivatives. The amount of the curing agent used is usually from 1 to 15 parts by weight per 100 parts by weight of the epoxy resin.

In addition to the epoxy resin and the curing agent, if necessary, various additives can be added for the purpose of, e.g., providing the composition with cohesive force of the extent that sheet molding is possible, preventing sagging, or of increasing wetting properties by decreasing the melt viscosity.

For example, for the purpose of increasing sheet moldability, thermoplastic resins, e.g., polyvinyl butyral, polyamide, polyamide derivatives, polyester, polysulfone, polyketone, and high molecular weight epoxy resins derived from bisphenol A and epichlorohydrin, a butadiene-acrylonitrile copolymer and its derivatives, and the like can be added. The amount of the compound added is usually from 5 to 100 parts by weight per 100 parts by weight of the epoxy resin.

For the purpose of preventing the sagging of the composition, fillers such as calcium carbonate, talc, asbestos, silicic acids, carbon black, and colloidal silica can be added. The amount of the filler added is usually from 10 to 300 parts by weight per 100 parts by weight of the epoxy resin.

Compounds which can be used to decrease the melt viscosity, increasing wetting properties include reactive diluents, such as butyl glycidyl ether, and monoglycidyl ethers of long chain alcohols, phthalic acid-based plasticizers, such as dioctyl phthalate, and phosphoric acid-based plasticizers, such as trichlene diphosphate. The amount of the compound added is usually from 5 to 300 parts by weight per 100 parts by weight of the epoxy resin.

Of the first and second thermosetting resin composition layers, the second thermosetting resin composition layer is desired to have tackiness at ordinary temperatures. The reason for this is that the tackiness of the second thermosetting resin composition layer makes it easy to preliminarily bond the reinforcing sheet to a metallic plate before its heat-curing. Of course, the first thermosetting resin composition layer also may have tackiness.

In the first thermosetting resin composition layer, a reinforcing material is embedded to increase the metallic plate-reinforcing effect. Reinforcing materials which can be used include cloths of inorganic fibers, such as glass fiber and asbestos fiber, cloths of organic fibers, such as flax, cotton, nylon, polyester, and polypropylene, plastic films, such as polyester films, and nylon films, paper, such as kraft paper, unwoven fabrics of polyester fiber, polypropylene fiber, etc., and metal foils of aluminum, iron, copper, zinc, etc.

In the case that the prepreg is a single layer structure, the amount of the reinforcing material is from 5 to 30% based on the weight of the prepreg, and in the case that the prepreg is a two-layer structure, the amount thereof is from 15 to 60% based on the weight of the first thermosetting resin composition layer.

The reinforcing material can be embedded by coating the thermosetting resin composition on one or both sides of the reinforcing material or by impregnating one or both sides of the reinforcing material with the thermosetting resin composition in molding the first thermosetting resin composition layer in a sheet form. Of the above-described reinforcing-materials, inorganic fiber cloths are preferred because they can produce a sufficiently high reinforcing effect even by one-side impregnation. In particular, it is preferred to use glass fiber cloths.

As described above, the prepreg of the present reinforcing adhesive sheet is preferably of the two-layer structure consisting of the first and second thermosetting resin composition layers combined together in one body by lamination. This lamination of the first and second thermosetting resin composition layers can be achieved by utilizing their tackiness or by bonding them together by heating to the extent that they are cured only insufficiently.

The thickness of the present reinforcing adhesive sheet varies with the type of the metallic plate, and the degree of reinforcement. In general, the thickness of the first thermosetting resin composition layer is from about 0.01 to about 10 mm and preferably from about 0.1 to about 5 mm; the thickness of the second thermosetting resin composition layer is from about 0.1 to about 30 mm and preferably from about 0.5 to about 10 mm; and the total thickness of the prepreg is usually from about 0.2 to about 40 mm and preferably from about 0.5 to about 20 mm.

In the present invention, it is also possible that foaming agents are incorporated into the second thermosetting resin composition layer so that the second thermosetting resin composition forms a cured foamed layer on heating the reinforcing adhesive sheet for reinforcement. The expansion ratio of the composition layer is not greater than 4, preferably not greater than 2 or 3. The tensile modulus of the cured foamed layer is, of course, less than that of the first thermosetting resin composition which has been cured, and is preferably controlled within the range of from 0.1 to 22 kg/mm$^2$, preferably 1 to 10 kg/mm$^2$.

Any foaming agents can be used so long as they are capable of foaming at temperatures at which the reinforcing adhesive sheet of the invention is to be heat-cured. In general, azo compounds, nitroso compounds, hydrazide compounds, etc., can be used. These compounds can be used alone or in combination with auxiliary foaming agents, e.g., urea and carboxylic acid metal salts.

The reinforcing adhesive sheet of the invention comprises the above-described sheet prepreg and the flattened tubular material capable of nearly recovering the original tubular form on heating. In preparing this flattened tubular material, a tubular material is first produced. The tubular material as used herein is made of relatively flexible materials, such as polymeric materials, usually having a thickness of from about 0.1 to about 5 mm, and can be generally produced by the use of extruders. Polymers which can be used in the production of such tubular materials include polyethylene (MI: 0.2–100 g/10 min), an ethylene-vinyl acetate copolymer, polypropylene, polystyrene, polyvinyl chloride, an ethylene-propylene terpolymer, nitrile rubber, butyl rubber, and acrylonitrile-butadiene-styrene rubber. If necessary, fillers, pigments, antioxidants, and stabilizers may be added thereto.

In the present invention, it is preferred that the tubular material is subjected to a cross-linking treatment. This cross-linking treatment can be performed by various techniques. In particular, irradiation with ionizing rays, e.g., electron rays and gamma rays, or ultraviolet rays is effective. In addition, there may be employed a method in which cross-linking agents are previously added alone or in combination with cross-linking accelerators in the production of the tubular material, and the heat cross-linking is achieved by the action of such additives. Cross-linking agents and their accelerators which can be used include peroxides, such as dicumyl peroxide, lauryl peroxide, benzoyl peroxide, and methyl ethyl ketone peroxide, thiuram-type compounds, and dithiocarbamic acid salt compounds.

The tubular material which has been subjected to the cross-linking treatment is then pressed in the radial direction to form the desired flattened tubular material. This can be performed in any desired manner, e.g., by press molding or by passing through heated rolls. Care must be taken to ensure that the tubular material is appropriately pressed because if the tubular material is pressed excessively in the radial direction, it is difficult for the resulting flattened tubular material to recover the original tubular form on heating.

When the tubular material is pressed to provide the flattened tubular material, if the inner surfaces of the tubular material melt-adhere to each other, it is difficult for the flattened tubular material to recover the original form in a uniform tubular shape. On the other hand, if they do not adhere to each other, the flattened tubular material peels apart from the sheet prepreg, deteriorating the press workability to the prepreg. In order to overcome these problems, it is preferred to fabricate the tubular material so that it is of the two-layer structure. For example, in the two-layer structure, the inner peripheral surface is made of, e.g., a hot-melt type resin so that the hot-melt type resin layer readily melts on heating. When the thus-fabricated tubular material is press-molded, the hot-melt type resin layer acts as an adhesive, whereas when heated, it melts and does not prevent the flattened tubular material from recovering the original tubular form. Therefore, the hot-melt type resin layer is preferred to melt at a temperature lower than the temperature at which the flattened tubular form recovers the original tubular form. Moreover, the object can be attained by another embodiment in which a tubular material of the one-layer structure is first produced, and the above-described hot-melt type resin layer is separately produced in a sheet or rod form, which is then inserted in the tubular material of the one-layer structure and pressed, for example, by hot press molding.

The thus-produced flattened tubular material is press-adhered to the sheet prepreg made of the above-described thermosetting resins to provide the reinforcing adhesive sheet of the invention. On the opposite side of the reinforcing adhesive sheet in relation to the flattened tubular material, a protective film may be provided. This protective film produces the following advantages:

(1) When the reinforcing adhesive sheet with a protective sheet provided thereon is stored in the form of a rolled tape before use, the protective film acts as a separator, preventing problems such as the adhesion between layers. Furthermore, the reinforcing adhesive sheet can be applied onto, for example, a door outer panel without separating the protective film. For this reason, the operation of separating the protective film can be omitted, which desirably accelerates the reinforcing operation.

(2) After the heat-curing of the reinforcing adhesive sheet of the invention, the protective film remains as part of the sheet and, therefore, it can be expected that the protective film also participates in the reinforcement of, for example, car door outer panels. Moreover, since the protective film is provided on the reinforcing adhesive sheet in such a manner that it covers the entire surface of the fiber-reinforced resin layer, it improves the moisture resistant characteristics of the fiber-reinforced resin layer, preventing a reduction in the reinforcing effect with a lapse of time. Thus, the protective film makes it possible to produce a reinforcing layer of high reliability.

The protective film possesses the above-described functions, and is made of polymeric materials having excellent strength, moisture resistance, heat resistance, and so forth. The thickness of the protective film is usually from about 0.001 to about 0.5 mm and preferably from about 0.003 to about 0.1 mm. A particularly preferred example is a polyester film having a thickness of $50\mu$ or less, preferably 5 to $20\mu$. In addition, various films, such as a polyethylene film, a nylon film, a polyvinyl chloride film, and a polypropylene film, can be used.

The reinforcing adhesive sheet of the invention is preferably such that the sheet prepreg does not materially flow and has self-supporting properties at ordinary temperatures, but that as a whole it is in a high viscous state. These preferred sheets have flexibility and pliability, and even when folded at an angle of from 250° to 300°, and free from damages and have an ability to recover their original form. Therefore, they have shape adaptability and can be applied even to those members (metallic plates) which are, for example, in a wave-like, angular, square, or curved form. Accordingly, they are very useful as reinforcing sheets.

Typical members which are to be reinforced with the reinforcing adhesive sheet of the invention include metallic plates, particularly car body steel plates such as outer panels of cars. Moreover, the reinforcing adhesive sheet of the invention can be applied to those thin metallic plates which are used in various types of cars, and home electric appliances, e.g., washing machines and televisions. The thickness of these metallic plates, particularly steel plates is from about 0.3 to 2.0 mm, preferably 0.5 to 1.0 mm. The reinforcing adhesive sheet of the present invention can also be applied to various plates of synthetic resins.

The reinforcing adhesive sheet of the invention is press-adhered to, for example, the back surface of steel plates in the case of car body steel plates, and thereafter, heat-cured by the usual heating method, e.g., in a hot air circulation type heating furnace, an infrared ray heating furnace, and a radio-frequency induction heating furnace. This heat-curing treatment can be carried out simultaneously at a paint baking stage of car body steel plates in the car production line.

Figure 2:
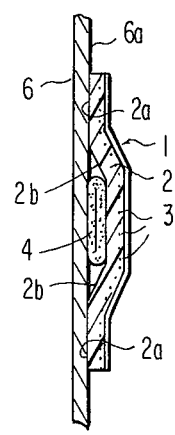
FIG. 2 is a cross-sectional view of the reinforcing adhesive sheet of FIG. 1, which is bonded to a car door outer panel.

FIG. 1 is a perspective view of a reinforcing adhesive sheet of the invention, and FIG. 2 is a cross-sectional view of the reinforcing adhesive sheet of FIG. 1 which has been attached to a member to be reinforced. Referring to FIGS. 1 and 2, the reinforcing adhesive sheet 1 comprises an uncured or half-cured thermosetting resin prepreg 2 containing a reinforcing material 3, and a flattened tubular material 4. The flattened tubular material 4 is fabricated so that it is narrower than the prepreg 2. Portions 2a—2a extending beyond the flattened tubular material 4 are bonded to the member to be reinforced, for example, the back surface 6a of a car door outer panel 6.

Figure 3:
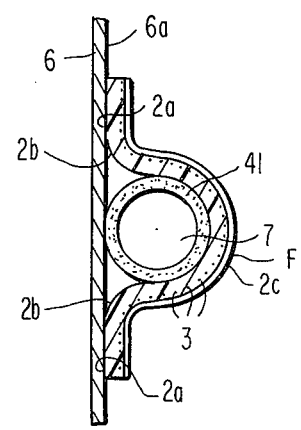
FIG. 3 is a cross-sectional view of the reinforcing adhesive sheet of FIG. 1, which is heated, illustrating the condition that the flattened tubular material has recovered the original tubular form.

When the reinforcing adhesive sheet attached to the back surface 6a of the car door outer panel 6 as shown in FIG. 2 is heated, the viscosity of the thermosetting resin prepreg 2 drops temporally, and the extended portions come into closer contact with the door outer panel 6. At the same time, the flattened tubular material 4 increases its cross-sectional area, recovering the original tubular form. Before the thermosetting resin prepreg 2 cures while being pushed up from portions 2b—2b, an expanded convex portion 2c is formed. With further heating, the thermosetting resin prepreg 2 is cured in the state shown in FIG. 3. In FIG. 3, the reference numeral 7 represents the tubular material which has recovered the original tubular form, and F represents a protective film which is, if necessary, provided on the outer surface of the thermosetting resin prepreg 2, and which is made of, for example, a polyester film.

Figure 4:
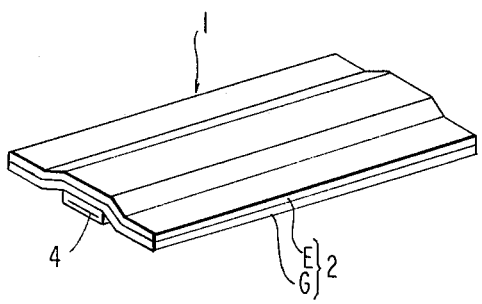
FIG. 4 is a perspective view of another reinforcing adhesive sheet of the invention.
Figure 5:
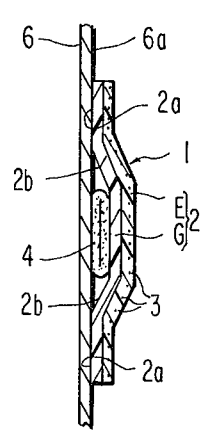
FIG. 5 is a cross-sectional view of the reinforcing adhesive sheet of FIG. 4, which is bonded to a car door outer panel.

FIG. 4 is a perspective view of another reinforcing adhesive sheet of the invention, and FIG. 5 is a cross-sectional view of the reinforcing adhesive sheet of FIG. 4, which has been attached to a member to be reinforced. The reinforcing adhesive sheet of FIG. 4 or 5 is the same as that of FIG. 1 or 2 except that the sheet prepreg of the former reinforcing adhesive sheet is of the two-layer structure comprising a first thermosetting resin composition layer E and a second thermosetting resin composition layer G. The first thermosetting resin composition layer E contains a reinforcing material 3 in an uncured or half-cured thermosetting resin prepreg 2, and the thermosetting resin composition is formulated so that when heat-cured on a metallic plate 6, provides a tensile modulus sufficient to increase the stiffness of the metallic plate 6, and also, a high glass transition temperature. In the second thermosetting resin composition layer G, the thermosetting resin composition is formulated so that when heat-cured, provides a tensile modulus insufficient to increase the stiffness of the metallic plate 6, and also, a low glass transition temperature.

Figure 6:
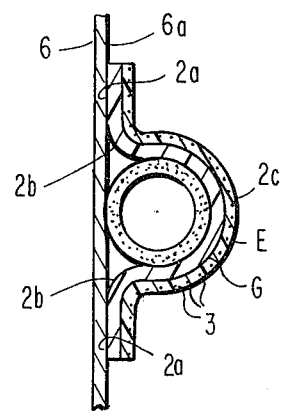
FIG. 6 is a cross-sectional view of the reinforcing adhesive sheet of FIG. 4, which is heated, illustrating the condition that the flattened tubular material has recovered the original tubular form.

FIG. 6 is a cross-sectional view of the reinforcing adhesive sheet of FIG. 4 or 5, which has been attached to, for example, a car door outer panel, and heat-cured. The final condition of the reinforcing adhesive sheet as shown in FIG. 6 is reached in the same manner as described in FIG. 3.

The reinforcing adhesive sheet of the invention, comprising a thermosetting resin prepreg with a reinforcing material embedded therein and a flattened tubular material provided on one side of the thermosetting resin prepreg, said flattened tubular material being capable of recovering the original tubular form on heating, when attached onto a member to be reinforced and heat-cured, produces a great reinforcing effect, and furthermore, it produces various advantages such as convenience of application.

Since the thermosetting resin prepreg of the reinforcing adhesive sheet of the invention is in an uncured or half-cured condition before it is adhered to plate members, such as metallic plates, it usually has flexibility. Because of this flexibility, the reinforcing adhesive sheet of the invention can be used to reinforce those plate materials having a curved surface or an uneven surface.

The present invention is described in detail with reference to the following examples. All parts are by weight. However, the scope of the invention is not limited to these examples.

EXAMPLE 1

An epoxy resin composition consisting of 50 parts of Epikote #828 (a bisphenol A type liquid epoxy resin produced by Yuka Shell Co., Ltd.), 10 parts of Epomic R-151 (a flexible epoxy resin produced by Mitsui Petrochemical Co., Ltd.), 40 parts of BAILON #500 (a polyester resin produced by Toyo Boseki Co., Ltd.), 5 parts of dicyandiamide (a latent curing agent for epoxy resins, produced by Nippon Carbide Co., Ltd.), 5 parts of Curezole 2MZ-AZINE (a latent curing agent for epoxy resins, produced by Shikoku Chemical Co., Ltd.), 50 parts of talc, and 2 parts of asbestos powder was kneaded in an ordinary mixing roll. The thus-prepared resin mass was molded in a 1 mm thick sheet by a straight hydraulic press, and a glass cloth (WF-22D 104, produced by Nitto Boseki Co., Ltd.) was laminated thereon as a reinforcing material to produce a thermosetting resin prepreg.

A polyethylene resin (Sumikasen L-705, produced by Sumitomo Chemical Co., Ltd.) was molded in a tubular form by means of an extruder to produce a polyethylene tubular material having an outer diameter of 10 mm and a thickness of 0.8 mm. This tubular material was irradiated with 20 Mrad electron rays by the use of an electron ray accelerator. In the polyethylene tubular material which had been irradiated with electron rays was inserted a rod-like material (diameter, about 1 mm) of an ethylene-vinyl acetate copolymer (Evaflex #105, produced by Mitsui Polychemical Co., Ltd.), which was then pressed in the radial direction thereof by passing through heated rolls maintained at about 80° C. to obtain a flattened tubular material in which the ethylene-vinyl acetate copolymer served as a hot melt type adhesive.

This flattened tubular material was laminated on the sheet-formed thermosetting resin prepreg cut to a 50 mm width at the opposite side thereof in relation to the glass cloth-laminated side. There was thus-obtained a reinforcing adhesive sheet of the invention.

The reinforcing adhesive sheet was press-adhered to a 0.8 mm thick steel plate in such a manner that the glass cloth of the prepreg faced outward and, thereafter, heated in an atmospher maintained at 140° C. for 30 minutes. First, the ethylene-vinyl acetate copolymer melted, then the flattened polyethylene tubular material nearly recovered the original tubular form, and finally the thermosetting resin prepreg cured in a convex form conforming to the tubular polyethylene material.

The thus-reinforced steel plate was subjected to a strength testing as described hereinafter. The maximum bending stress of the reinforced steel plate was 45 kg/50 mm width, whereas that of the steel plate per se was 9 kg/50 mm width. It has thus been found that there could be obtained a great reinforcing effect.

Strength Testing

A 50 mm wide specimen was horizontally mounted on two vertical plates (width, 50 mm) placed apart in parallel so that the distance of the top ends thereof was 100 mm, said top end having a reversed U-shaped cross section of a radius of curvature of 5 mm. Another vertical plate (width, 50 mm), the top end having a reversed U-shaped cross section of a radius of curvature of 5 mm, was centrally placed on the specimen, and pressure was applied to measure the maximum bending stress (kg/50 mm width).

EXAMPLE 2

An epoxy resin composition consisting of 50 parts of Epikote #828 (a bisphenol A type liquid epoxy resin, produced by Yuka Shell Co., Ltd.), 35 parts of Epikote #1002 (a bisphenol A type solid epoxy resin, produced by Yuka Shell Co., Ltd.), 15 parts of BAILON #500 (a polyester resin, produced by Toyo Boseki Co., Ltd.), 5 parts of Curezole 2MZ-AZINE as used in Example 1, 5 parts of dicyandiamine as used in Example 1, 50 parts of talc, and 2 parts of asbestos powder was kneaded in an ordinary mixing roll. The thus-prepared resin mass was molded in a 0.5 mm thick sheet by a straight hydraulic press, and the glass cloth as used in Example 1 was laminated thereon to form a first thermosetting resin composition layer in an uncured state.

A mixture of 80 parts of Epikote #871 (a dimer acid-modified epoxy resin produced by Yuka Shell Co., Ltd.), 10 parts of Epikote #1002 (same as described above), and 10 parts of Hiker CTBN 1300X8 (BF., nitrile rubber produced by Goodrich Corp.) was melted and mixed in a mixing vessel. To 100 parts of the resulting composition were added 5 parts of Curezole 2MZ-AZINE (same as described above), 5 parts of dicyandiamide, 50 parts of talc, and 2 parts of asbestos powder, which was then kneaded in an ordinary mixing roll and molded in a sheet form by a straight hydraulic press to produce a 0.8 mm thick second thermosetting resin composition layer in an uncured state.

The above-produced first and second thermosetting resin composition layers were bonded together to produce a thermosetting resin prepreg. The tensile moduli of the first and second thermosetting resin composition layers which had been heat-cured were 95 kg/mm$^2$ and 3.0 kg/mm$^2$, respectively. This heat curing was performed at 150° C. for 60 minutes.

Using the same polyethylene resin as used in Example 1 and an ethylene-vinyl acetate copolymer resin (Everflex #220, produced by Mitsui Polychemical Co., Ltd.), a two-layer tubular material, the outer layer being made of the polyethylene resin, was produced by the use of a two-layer extrusion molding machine. The outer diameter of the tubular material was 10 mm, and the thicknesses of the polyethylene resin layer and the ethylene-vinyl acetate copolymer resin layer were 0.7 mm and 0.3 mm, respectively.

The thus-produced tubular material was irradiated with 20 Mrad electron rays by the use of an electron ray accelerator and, thereafter, pressed in the radial direction by passing through heated rolls maintained at about 80° C. as in Example 1 to obtain a flattened two-layer structure tubular material in which the ethylene-vinyl acetate copolymer resin served as an adhesive. This flattened tubular material was press-adhered to the second thermosetting resin composition layer of the above-produced two-layer structure thermosetting resin prepreg cut to a 50 mm width to produce a reinforcing adhesive sheet.

The reinforcing adhesive sheet was press-adhered to a 0.8 mm thick steel plate in such a manner that the second thermosetting resin composition layer was in contact with the steel plate and, thereafter, heat-cured at 140° C. for 30 minutes. The thus-obtained reinforced steel plate was subjected to the same strength testing as in Example 1 with the results that the maximum bending stress was 50 kg/50 mm width. It has thus been found that the reinforcing effect was very great. The sink (deformation) phenomenon of the steel plate was examined with the eye, but not observed at all, and the appearance was good.

EXAMPLE 3

The the opposite side of the thermosetting resin prepreg produced in Example 1 in relation to the glass cloth-laminated side, a polyester film (Lumilar #9, produced by Toray Co., Ltd.) was bonded as a protective film. In addition, the flattened tubular material produced in Example 1 was press-adhered to the opposite side of the thermosetting resin prepreg in relation to the polyester film side to produce a reinforcing adhesive sheet of the invention.

The thus-produced reinforcing adhesive sheet was press-adhered to a 0.8 mm thick steel plate in such a manner that the polyester film faced outward. This operation was performed while unwinding the reinforcing adhesive sheet which had been wound up. The protective polyester film did not cause the problems of adhesion between layers and contamination by the attachement of resin, and the operation could be performed very smoothly.

The reinforcing adhesive sheet was heat-cured at 140° C. for 30 minutes. Thus, there could be formed a reinforcing layer bearing the polyester film well adhered to the thermosetting resin convex portion. The appearance, the moisture resistance, the abrasion resistance, and so forth were excellent because of the presence of the polyester film.

While the invention has been described in detail and with reference to specific embodiments thereof, it will be apparent to one skilled in the art that various changes and modifications can be made therein without departing from the spirit and scope thereof.

What is claimed is:

1. A reinforcing adhesive sheet comprising a thermosetting resin sheet-shaped prepreg with a reinforcing material embedded therein, and a flattened tubular material provided on one side of the prepreg, said flattened tubular material being capable of nearly recovering the original tubular form on heating and being narrower in width than the prepreg.

2. The reinforcing adhesive sheet as claimed in claim 1, wherein the flattened tubular material is prepared using a cross-linked thermoplastic resin tubular material.

3. The reinforcing adhesive sheet as claimed in claim 2, wherein the thermoplastic resin tubular material is a polyethylene resin tubular material.

4. The reinforcing adhesive sheet as claimed in claim 1, wherein the flattened tubular material is prepared using a tubular material of the two-layer structure, the inner layer being a hot melt type resin layer.

5. The reinforcing adhesive sheet as claimed in claim 1, wherein the prepreg comprises a first thermosetting resin composition layer with a reinforcing material embedded therein, said composition being formulated so that when heat-cured, it produces a sufficient tensile modulus, and a second thermosetting resin composition layer, said composition being formulated so that, when heat-cured, produces an insufficient tensile modulus, and the flattened tubular material is provided at the side of the second thermosetting resin composition layer.

6. The reinforcing adhesive sheet as claimed in claim 5, wherein the first thermosetting resin composition layer is an epoxy resin composition layer which, when heat-cured, has a tensile modulus of from 30 to 500 kg/mm$^2$, and the second thermosetting resin composition layer is an epoxy resin composition layer which, when heat cured, has a tensile modulus of from 0.1 to 22 kg/mm$^2$.

7. The reinforcing adhesive sheet as claimed in claim 1, wherein the reinforcing material is a glass fiber cloth.

8. The reinforcing adhesive sheet as claimed in claim 1, wherein the prepreg is covered with a protective film at the opposite side thereof in relation to the flattened tubular material-provided side.

9. The reinforcing adhesive sheet as claimed in claim 8, wherein the protective film is a polyester film.

10. The reinforcing adhesive sheet as claimed in claim 5, wherein the first thermosetting resin composition layer has a thickness within the range of from 0.01 to about 10 mm and the second thermosetting resin composition layer has a thickness within the range of from 0.1 to about 30 mm.

11. The reinforcing adhesive sheet as claimed in claim 10, wherein the first layer has a thickness within the range of from 0.1 to about 5 mm and the second layer has a thickness within the range of from 0.5 to about 10 mm.

12. The reinforcing adhesive sheet as claimed in claim 5, wherein the total thickness of the prepreg is within the range of from about 0.2 to about 40 mm.

13. The reinforcing adhesive sheet as claimed in claim 12, wherein the total thickness of the prepreg is within the range of from about 0.5 to about 20 mm.

14. The reinforcing adhesive sheet as claimed in claim 2, wherein the flattened tubular material is prepared using a tubular material of the two-layer structure, the inter layer being a hot-melt type resin layer.

15. The reinforcing adhesive sheet as claimed in claim 2, wherein the prepreg comprises a first thermosetting resin composition layer with a reinforcing material embedded therein, said composition being formulated so that, when heat cured, it produces an increased tensile modulus, and a second thermosetting resin composition layer, said compositing being formulated so that, when heat-cured, produces a decreased tensile modulus.

16. The reinforcing adhesive sheet as claimed in claim 5, wherein the reinforcing material is a glass fiber cloth.

17. The reinforcing adhesive sheet as claimed in claim 5, wherein the prepreg is covered with a protective film at the opposite side thereof in relation to the flattened tubular material-provided side.

18. The reinforcing adhesive sheet as claimed in claim 14, wherein the hot-melt type resin layer melt at a temperature lower than the temperature at which the flattened tubular material recovers the original tubular form.

* * * * *